Aug. 15, 1961   F. HEINZMANN   2,995,936
VARIABLE SPEED-CONTROL DEVICE

Filed Oct. 17, 1956   3 Sheets-Sheet 1

INVENTOR;
FRITZ HEINZMANN
BY Burgess, Dinklage & Sprung
ATTORNEYS

Aug. 15, 1961 F. HEINZMANN 2,995,936
VARIABLE SPEED-CONTROL DEVICE
Filed Oct. 17, 1956 3 Sheets-Sheet 2
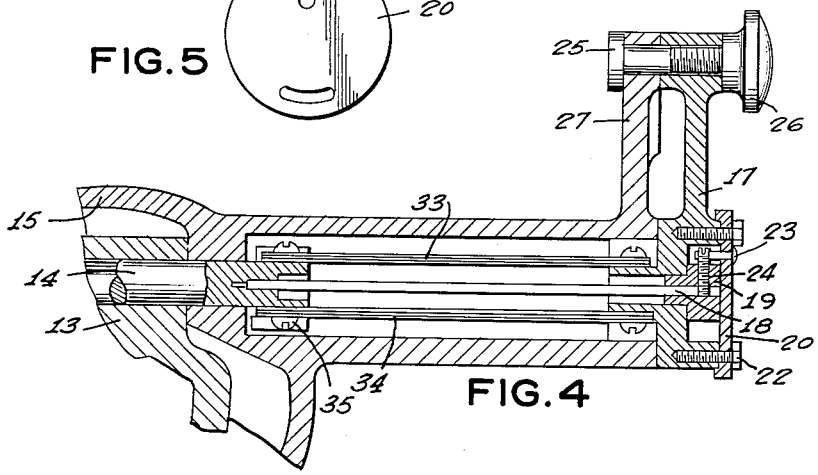
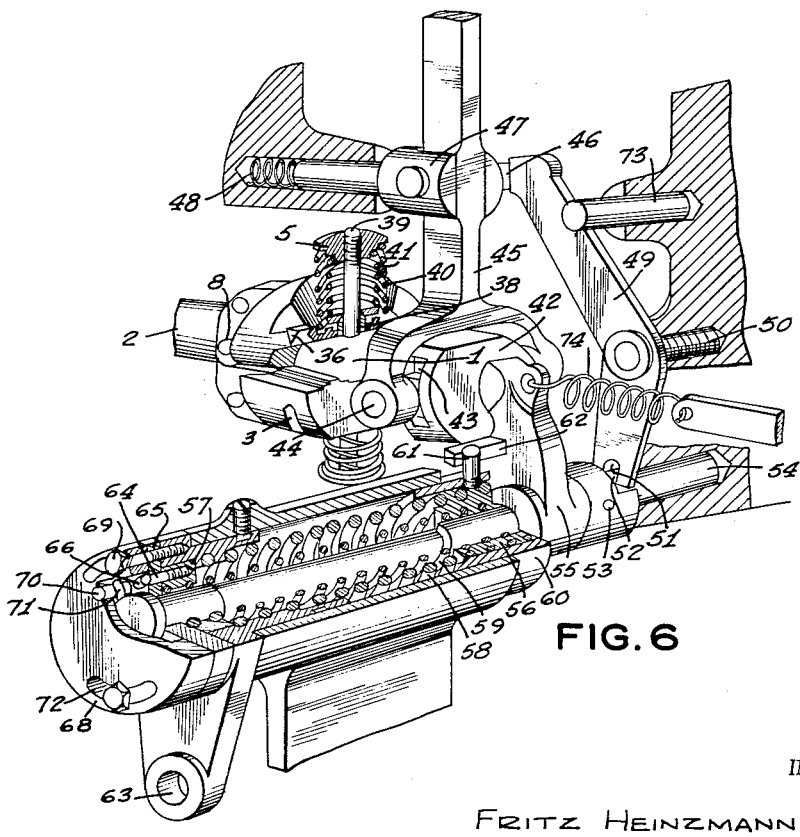
INVENTOR:
FRITZ HEINZMANN
BY Burgess, Dinklage & Sprung
ATTORNEYS

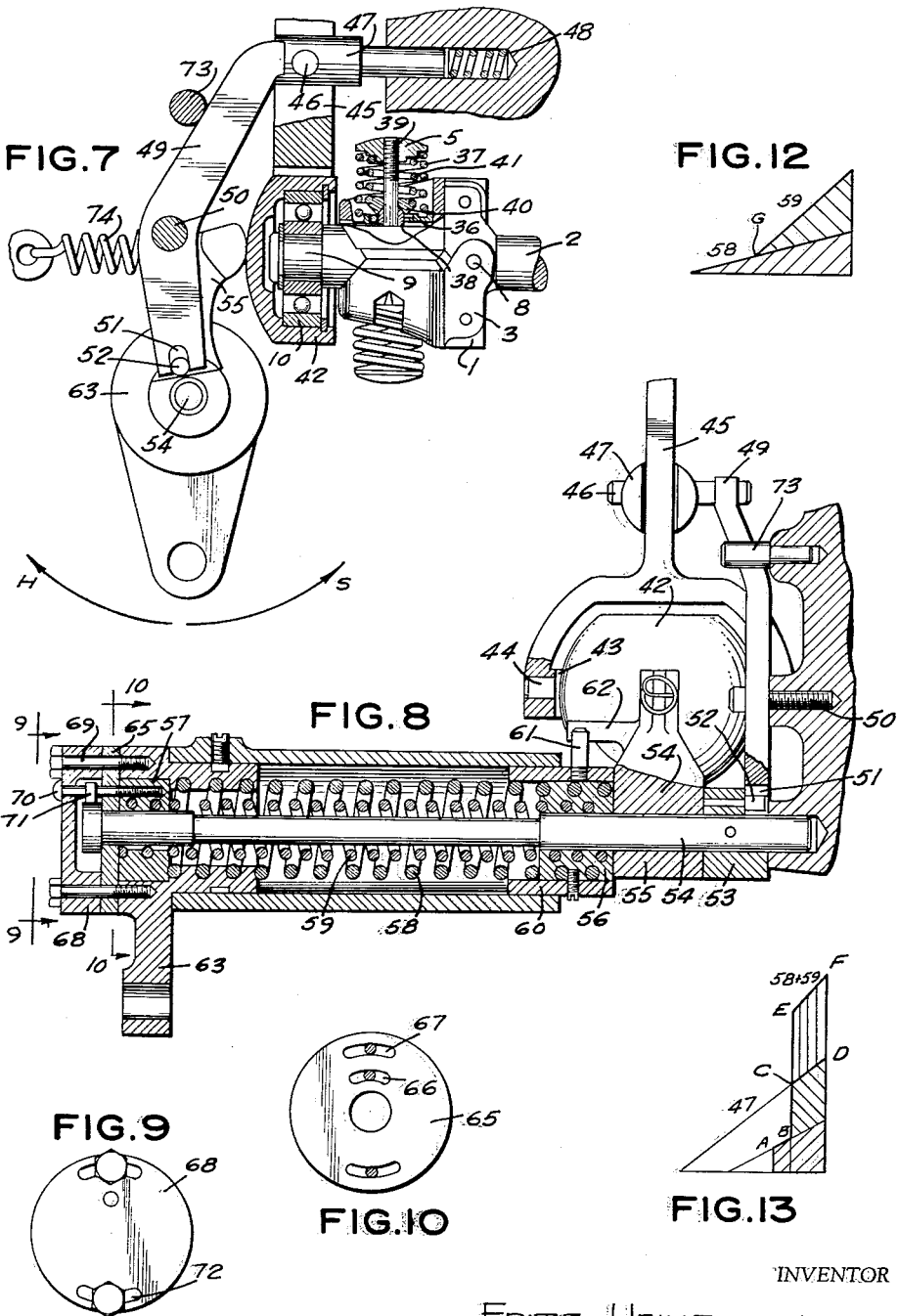

United States Patent Office 2,995,936
Patented Aug. 15, 1961

2,995,936
VARIABLE SPEED-CONTROL DEVICE
Fritz Heinzmann, Albershausen, Kreis Goppingen,
Wurttemberg, Germany
Filed Oct. 17, 1956, Ser. No. 616,541
14 Claims. (Cl. 73—537)

This invention relates to a variable speed control device. The invention more particularly relates to a variable speed control device for use in combination with a centrifugal governor, and preferably a centrifugal governor having transverse springs which act directly on the fly weights.

The use of centrifugal governors in connection with internal combustion engines for controlling the engine speed is, of course, well known. In connection with certain internal combustion engines, as, for example, diesel engines used in connection with vehicles, the governor is used in combination with a manual control, and it is desirable that the governor only be operable, for example, in the lower and upper speed ranges with the control being effected manually in the intermediate ranges.

In order to provide the variable speed control combination with the centrifugal governor, additional springs exerting force on the governor have been used in combination with the governor.

Due to the small length and size of many modern internal combustion engines, it is not always possible to position these additional springs co-axially with the governor, where the governor is positioned alongside the engine. If the springs are arranged above or under the governor, the same must act on the regulating lever through a linkage arrangement which has the disadvantage that additional forces must be transmitted through the linkage joints, increasing the internal friction of the governor.

If the springs are arranged co-axially with the governor, and tension and pressure springs are provided, the springs must have a comparatively large diameter, since the adjusting member which tensions or relaxes the additional springs, must move over a long axial stroke on a spindle going through the additional springs and fixed to the casing. This is a disadvantage, as it is difficult to obtain an exactly co-axial action of these springs so that a certain amount of friction is produced at the governor control member. It has also been proposed to use torsional springs which have their ends bent at right angles with respect to the spring axis. These springs, however, will not act co-axially and do not allow accurate control.

One object of this invention is a variable speed control device for use in combination with a centrifugal governor, and preferably a centrifugal governor having transverse springs, without the above-mentioned disadvantages. This, and still further objects, will become apparent from the following description, read in conjunction with the drawings, in which:

FIG. 4 is a vertical section of a portion of a still further embodiment of a variable speed control device;

FIG. 5 is a plan view of the end plate or disc of the embodiments shown in FIGS. 2 and 4;

FIG. 6 is a perspective view partially in section of a further embodiment of a variable speed control device and centrifugal governor suitable for use in connection with a vehicle diesel engine and showing the various control linkages;

FIG. 7 is a side elevation partially in section of the device shown in FIG. 6;

FIG. 8 is a front elevation partially in section of the device shown in FIG. 6;

FIG. 9 is a plan view of the end cap 68 of the embodiment shown in FIG. 6;

FIG. 10 is a cross-section of the embodiment shown in FIG. 8;

FIG. 12 shows a force diagram of the additional forces resulting from the combination of the centrifugal governor and the variable speed control device of FIGS. 6 through 8;

FIG. 13 is a centrifugal force diagram of the governor of FIGS. 6 through 8, the governor stroke being drawn in the direction of the axis of the abscissa and the certifugal forces drawn in the direction of the odrinance.

Figure 1:
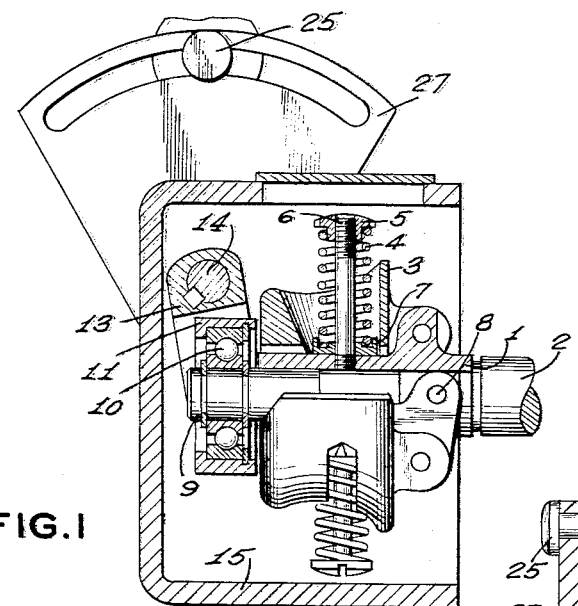
FIG. 1 is a side elevation partially in section of an embodiment of a variable speed control device and centrifugal governor in accordance with the invention.
Figure 2:
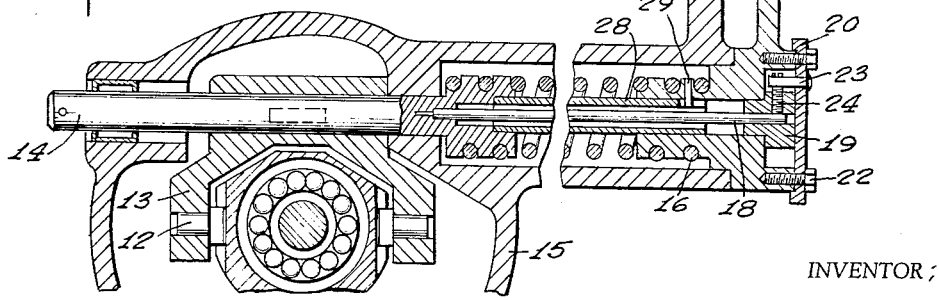
FIG. 2 is a vertical section of the embodiment shown in FIG. 1.

Referring to the embodiment shown in FIGS. 1 and 2, the governor shown in FIGS. 1 and 2 is not a maximum-minimum governor, but a one-stage governor, whereas the governor shown in FIGS. 6 through 10 is a two-stage governor (also called maximum-minimum governor), and has the governor body 1, which is co-axially connected for rotation with the shaft 2, which may, for example, be the crank shaft of an internal combustion engine, such as a diesel engine, or a secondary shaft which is rotated by the crank shaft of the engine. Two opposed fly weights 3 are pivotally connected to the governor body, so that the same will swing outwardly due to centrifugal force upon rotation of the governor. A pair of opposed threaded spindles 6 are connected to the governor body at substantially right angles to its axis of rotation and extend through openings in the fly weights 3. Surrounding the threaded spindles 6 are transverse springs 4, which oppose the outward movement of the fly weights. The outer ends of the springs are retained by the nuts 5, which are screwed on the spindles 6. The inner ends of the springs press against spring supports 7, which are movably seated in the fly weights 3. The governor basically has the construction as disclosed in my co-pending application, Serial No. 195,786, filed november 15, 1950, now Patent No. 2,807,455. The movement of the fly weights 3 is transmitted to a control rod 9 by means of the transverse pivot 8, so that, as the fly weights move outwardly, the control rod 9 will be moved axially in a direction extending outward from the governor. A ball-bearing 10 is mounted on the control rod 9 with its inner movable race seated on the rod 9 and its outer race stationarily mounted in a ball-bearing cup 11. The ball-bearing cup 11 has two grooves, into which the trunnions 12 engage. The trunnions 12 are rotatably mounted on corresponding sockets in the forked lever 13, which is connected for rotation with the regulating lever shaft 14. The forked lever 13 is connected to the regulating lever shaft 14 by means of a key arrangement. The regulating lever-shaft 14 is connected to control mechanism of an internal combustion engine, such as a diesel engine, as, for example, the distributing mechanism by means of conventional rods and levers not shown in the drawing Both ends of the regulating lever shaft 14 are rotatably mounted in the governor casing 15 by means of bearings, as, for example, roller or slide bearings. One end of a helical torsion spring 16 is screwed into corresponding thread grooves in a speed-control lever 17, and the other end is screwed into corresponding screw grooves formed at the end of the regulating lever shaft 14. A torsion bar extends between the regulating lever shaft 14 and the speed-control lever 17 with one of its ends being secured in the shaft 14 and its opposed end secured in a bushing 19, which is rotatably mounted in the speed-control lever 17. The speed-control lever 17 has a central bore through which the torsion bar 18 extends, and in which the bushing 19 is seated. The outer end of this bore is widened and covered by means of a cover plate 20, provided with arched slots 21, as may thus be seen in FIG. 5. The cover plate 20 is fastened to speed-control lever 17 by means of screws 22, which extend through the arched slots 21. The cover plate 20 is connected to the bushing 19 and thus to the torsion bar 18 by means of the pin 23 and screw 24, which extend into the bushing. Movement of the lever 17 carrying with it the plate 20, is therefore transmitted through the torsion bar 18. The point at which the lever 17 tensions the torision bar may be adjusted by loosening the screws 22 and varying the position of the plate 20 by means of the arch slots 21. The control lever 17 has an arm provided with a nut and bolt arrangement 25 and 26 at its end. The bolt 25 extends through an arcuate slot in the plate 27 rigidly connected to the governor casing, so that the regulating lever 17 may be rotated to any desired control position by loosening the nut 26, and secured in this position by tightening the nut 26. A tube 28 surrounds the torsion bar 18 and is co-axially secured to the regulating lever shaft 14. The other end of the tube 28 is rotatably mounted in the speed-control lever 17. A projecting pin 29 is secured to the regulating lever 17 and extends into a grooved or cut-out portion in the tube 28, so that normally the same will not engage the tube, but when the lever 17 is turned to the stop position of the engine, i.e., counterclockwise, as shown, the same will engage the tube, rotating the same and thus causing the fly weights 3 of the centrifugal governor to move outwardly, overcoming the force of the transverse springs 4, closing the distributing mechanism and stopping the engine.

Figure 14:
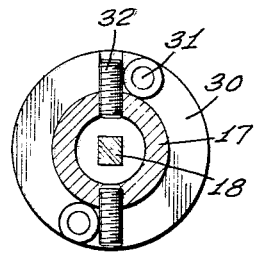
FIG. 14 is a cross section of the embodiment shown in FIG. 3.
Figure 3:
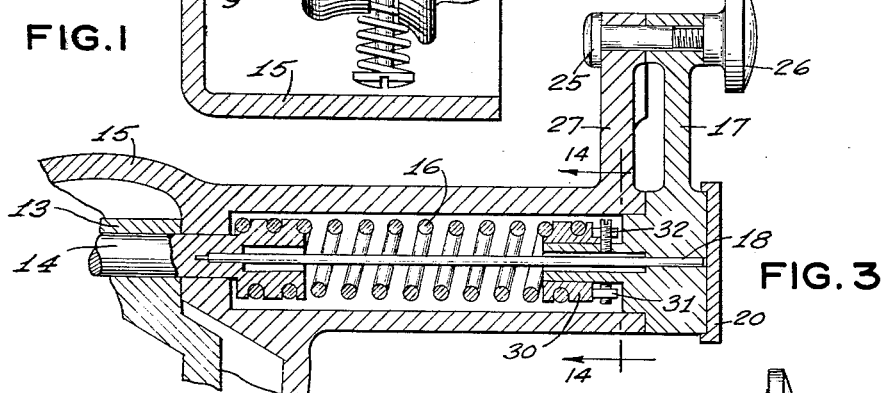
FIG. 3 is a vertical section of a portion of a further embodiment of a variable speed control device in accordance with the invention.

In the embodiment as shown in FIG. 3 and FIG. 14, the tube 28 is dispensed with and the helical torsional spring 16 is connected to a bushing 30, provided with pins 31, which are engaged by screw pins 32, which are secured to and rotate with the speed-control lever 17. In this embodiment, the torsion bar 18 is rigidly connected at one end to the regulating lever shaft 14 and at the other end to the speed-control lever 17.

In the embodiment shown in FIG. 4, the helical torsion spring 16 is replaced by packets or bundles of torsion plate springs. One end of the bundles of plate springs 33 and 34 is rigidly connected to the regulating lever shaft 14, while the other ends are rigidly connected to the speed-control lever 17, as, for example, by means of the screws 35. The torsion bar 18 is connected in the manner shown in FIGS. 1 and 2. With with embodiment it is possible to provide a different number of plate springs, which allows a change either in the range of speed control or the degree of irregularity.

Figure 11:
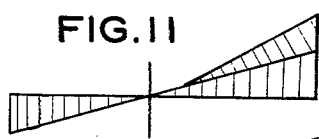
FIG. 11 is a force diagram of the embodiments shown in FIGS. 1 through 4, the angle by which the lever 17 is turned being shown in the direction of the axis of the abscissa, whereas the spring forces are shown in the direction of the ordinate, the forces below the axis of the abscissa being relaxing additional forces, and the forces above this axis being the loading additional forces.

In operation of the embodiments shown in FIGS. 1, 2, and 4, the governor body rotates by the rotation of the shaft 2, and the desired speed is set by a suitable adjustment of the speed-control lever 17. The helical spring 16 is shown in FIGS. 2 and 3 or the plate spring bundles 33, 34, as shown in FIG. 4, exert torsional forces on the regulating lever shaft 14, depending upon the position of the speed-control lever 17, as may be seen in the force diagram of FIG. 11. A neutral point on the lever 17 is chosen, which is represented by the intersection of the X and Y axis. As the speed-control lever 17 is turned in the positive direction, additional loading forces occur, as is represented by the shaded portion, and a point is reached where the pin 23 contacts the screw 24, tensioning the torsion bar 18, as is represented by the additional shaded portion in FIG. 11. When the lever is turned in the opposite direction, additional relaxing forces occur, as is shown by the shaded section below the abscissa. These additional forces are transmitted to the control rod 9 of the centrifugal governor by means of the forked lever 13, and thus act on the fly weights 3. The centrifugal governor is set to a medium speed, which is changed by the torsional springs 16 and 18, or 18, 33, 34 loading and discharging the control rod 9. The beginning and the range of tensioning of the torsion bar 18 can be varied for the type of irregularity desired, as, for example, whether an approximately constant degree of irregularity over the whole speed range is desired, or whether the other type of irregularity is desired. As the torsion bar 18 acts over its entire length, it is subject to a specific low strain. In accordance with the embodiments of FIGS. 2 and 4, the point at which the beginning of the tensioning of this bar commences may be easily adjusted from the outside, while loosening the screws 22 and turning the plate 20, and thereafter re-tightening the screws 22. In general, the cylindrical, helical spring 16 acts over the entire speed range partially in an additional sense, and partially in a subtractive sense, on the governor, exerting forces which decrease or increase the force exerted by the transverse spring 4 of the governor, as is shown by the lower shaded segment on the right-hand side of FIG. 11 and the shaded segment on the left-hand side of FIG. 11. The torsion bar 18 acts only in an additional sense on the governor, as is indicated by the upper shaded segment on the right-hand side of FIG. 11. The range of this action may be adjusted, as mentioned, by means of a suitable adjustment of the plate 20. The embodiment of FIG. 3 operates with the torsion bar 18 acting over the entire speed range and the spring 16 acting only in an additional sense at a point adjustably determined by the pins 31 and pins 32.

Referring to the embodiment shown in FIGS. 6 through 10, the centrifugal governor is similar to the governor of the embodiment of FIG. 1, except that two sets of transverse springs 37 and 41 are provided with the springs 41 being concentrically positioned within the springs 37. The springs 37, as shown in FIG. 7, are supported between the nut 5 and the spring supports 36, which are movably seated in the fly weights 3, while the springs 41 are positioned between the nuts 5 and annular bushings 40, which surround the spindles 39 and rest against annular collars 38 when fly weights are in their rest position. Upon rotation, as the fly weights move outwardly, the same move the supports 36, compressing the springs 37. After movement for a certain distance, the supports 36 engage and carry the bushings 40, so that compression of the springs 41 commences. This construction is identical with the preferred construction as set forth in my co-pending application Serial No. 195,786, filed November 15, 1950, now Patent No. 2,807,455. The governor is rotated by means of the shaft 2 connected to the crank shaft or a similarly rotating member of an engine and movements of the fly weights 3 caused by centrifugal force is transmitted by means of bell-crank levers formed integral with the fly weights and the transverse pin 8 to the control rod 9, on which the ball bearing 10 is seated in the same manner as in connection with the embodiment of FIG. 1. The ball bearing 10 is surrounded by a ball bearing cup 42, which has two transversely extending grooves 43, in which slide pieces of the trunnion arrangement 44 engage. The trunnion arrangement is mounted in a forked lever 45, which is pivotally mounted in the forked slide bar 47 slidably positioned in a bore provided in a stationary casing. A spring 48 biases the slide bar toward an extended position. The pivot pin 46 of the slide bar, around which the lever 45 pivots, is extended on one side and engages the lever 49, which is pivoted on the bolt 50 screwed into the stationary casing. By pivoting of the lever 49, the pivot point of the lever 45 may be displaced in the direction of movement of the slide bar. The spring 48 assures engagement contact between the pivot pin 46 and the lever 49. The lower end of the lever 49 is provided with a slot 51, which engages a pin 52 mounted on the bushing 53, which is rigidly connected to the shaft 54. Rotation of the shaft 54 will therefore cause rotation of the bushing 53, movement of the pin 52, and pivoting of the lever arm 49, causing displacement of the pivot pin 46 of the lever arm 45. A further lever arm 55 is rotatably mounted on the shaft 54 and engages the rear end of the ball bearing cup 42. A spring bushing 56 and a spring bushing 57 are also rotatably mounted on the shaft 54. An outer, cylindrical, helical, torsional spring 58 and an inner, cylindrical, helical torsional spring 59 are screwed into corresponding screw grooves in the bushing 56. A sleeve 60, which carries the projecting pin 61, surrounds and is rigidly secured to the bushing 56. The projecting pin 61 is so positioned that it will contact a projecting arm 62 carried by the lever arm 55. The sleeve 60 is rotatably guided in a stationary, cylindrical casing surrounding the springs. Tensioning of the torsional springs 58 and 59 will therefore cause rotational movement of the bushing 56 and sleeve 60, causing the pin 61, acting on the projecting arm 62, to rotate the lever arm 55, causing movement of the ball bearing cup 42, and thereby acting on the centrifugal governor. A spring 74 assures contact between the pin 61 and projection 62. The opposite end of the spring 58 is connected to the speed-control lever 63, while the other end of the spring 59 is screwed into the spring bushing 57. The bushing 57 has a projecting screw 64, which moves within the arched slot 66 provided in the disc 65. The disc 65 is additionally provided with the arched slots 67, as may best be seen from FIG. 10. An end cap 68 is adjustably secured to the control lever 63 by means of the bolts 69, which extend through the arched slot 72 in the cap 68 and the arched slot 67 in the disc 65. Upon tightening the bolts 69, the cap 68 and the disc 65 are rigidly connected for rotation with the speed-control lever 63, though the relative position of these parts with respect to the speed-control lever and to each may be adjusted by loosening the bolts 69 and moving the parts in relation to each other, as is allowed by the limits of the length of the arched slots. A pin 70 extends through the cap 68 and contacts a projecting pin or screw 71 secured to the shaft 54, so that movement of the speed-control lever 63 will cause rotation of the shaft 54 and movement of the lever 49. The stop 73 prevents the lever 49 from changing its position during speed control through the torsional springs 58 and 59. Movement of the speed-control lever 63 also transmits torsional force through the springs 58 and 59 to the bushing 56, sleeve 60, and pin 61, depending upon the position of the lever and the relationship of the discs 65 and arched slot 66, causing movement of the lever arm 55, which acts on the ball bearing cup 42, influencing the centrifugal governor.

The device as shown in FIGS. 6 through 10 is primarily intended for use in connection with vehicle engines, such as vehicle diesel engines, in which it is necessary to adjust the speed over a broad range, as, for example, between about 400 and 2,000 r.p.m.'s. The governor, however, only has to exhibit influence over a small part of the range, as, for example, in the lower limits, to prevent stalling, and in the upper limits to maintain constant speed under variable load conditions, while the intermediate range is solely controlled manually. Thus, for example, when the engine runs at its lowest speed, the governor should be operative to prevent stalling, but the manual-control lever should be able to so influence the governor to allow stopping of the engine. The intermediate range between, for example, 400 and 1,000 r.p.m. speed should be effected solely manually without operation of the governor. In the upper part of the speed range, as, for example, from above 1000 to 2000 r.p.m.'s, the speed must be variably adjusted manually, while regulation or speed drop from full load to non-load is kept small, so that within these limits the full turning moments of the engine may be utilized.

In operation, the rotation of the engine rotates the shaft 2, and thus the governor, with the speed being primarily controlled by the speed-control lever 63. FIG. 7 shows the speed-control lever 63 set up at point $c$ on the diagram of FIG. 13, which represents the central portion of the intermediate speed range where the engine is solely controlled manually by moving the lever 63. Movement of this lever causes rotation of the shaft 54, pivoting of the lever arm 49, and thus a movement of the pivot point 46 of the lever 45, the upper end of which is connected to the control mechanism of the engine, as, for example, the distributing mechanism. When the speed-control lever 63 is turned in the stopping directions S (see FIG. 7), the same turns the shaft 54 and lever 49 and thereby moves the slide bar 47 and the pivot pin 46, so that the center of rotation of the control lever 45 is moved in a direction to slow the engine in this speed range, the control rod 9 and with it the ball bearing cup 42 does not move and the speed control is made solely by displacing the part 46. In this manner speed control between the points $c$ and $b$ in FIG. 13 is effected. When operating in this range, the lever arm 55 does not contact the ball bearing cup 42, so that the torsion springs 58 and 59 do not exert any influence on the control lever 45 or the centrifugal governor. When speed-control lever 63 is turned down, so that the engine reaches around idle speed, the bushing 40 contacts the collar 38 in the governor, so that the springs 41 in this range will not press on the fly weights and the fly weights are only influenced by the force of the springs 37. The governor therefore commences to operate in this speed range, of, for example, 400 r.p.m., as is shown between points $a$ and $b$ in diagram 13, preventing stalling. When the speed-control lever is turned still farther in the direction of S, so that the speed at point $a$ of FIG. 13 drops still farther, the engine is stopped.

When the speed-control lever 63 is turned from the position C, as shown in FIG. 7, in the high-speed direction $h$, the same rotates the shaft 54 and bushing 55, pivoting the lever 49, thus causing movement of the pivot 46 and the control lever 45, increasing the speed. At the same time, the control lever 63 tensions the torsional spring 58. At the point $g$ in the diagram of FIG. 12, the torsional spring 59 is additionally tensioned by the disc 65 contacting and carrying the pin 64 with it as the same rotates to a point where the pin 64 contacts the end of the arch slot 66. This causes rotation of the bushing 57 and thus a tensioning of the spring 59, so that an additional torsion force is exerted, as is indicated in the portion of the diagram of FIG. 12 to the right of the point $g$. The forces of the springs 58 and 59 are transmitted through the pin 61 and projection 62 to the lever 55, which transmits these additional forces to the centrifugal governor.

The forces exerted on the centrifugal governor by the torsional springs 58 and 59 increase with increasing speed until the point $e$ as shown in FIG. 13 is reached, where the centrifugal governor will take over the speed control in the high speed range, as, for example, 2,000 r.p.m. At the point where the control actuation of the lever 63 is transmitted through the torsional spring, the lever 49 contacts the stop 73 so that the pivot point 46 of the control lever 45 cannot be further shifted by rotation of the shaft 54 and the shaft is held fast as the control lever 63 is further moved to the high speed range with the pin 71 losing contact with the pin 70. The control in the high speed range between the points $e$ and $f$ is thus solely controlled by the torsional springs and centrifugal governor.

By a suitable adjustment of the cap 68, effected by loosening the bolts 69, the point of rotation at which the control lever 63 will act on the shaft 54 may be varied, and thus the position of point $c$ adjusted. In the same manner, by adjustment of the disc 65, the point where the spring 59 is tensioned, i.e., the point g, may be controlled in order to adjust the degree of irregularity within the upper speed control range.

While the invention has been described in detail with reference to the specific embodiment, various changes and modifications will become apparent to the skilled artisan which fall within the spirit of the invention and scope of the appended claims. Thus, for example, a centrifugal governor of another construction than the governor shown may be used. In place of the torsion spring in FIGS. 2 and 3, a number of torsion springs may be used for the speed control. In place of the torsion springs 58 and 59 of FIGS. 6 to 10, torsion bars or flat torsion springs, as shown in FIG. 4, may be used. The movement of the center of rotation 46 of the regulating lever of FIGS. 6 to 10, may be made by an eccentric, instead of by a lever mechanism. The variable speed device may, for example, be arranged above the governor's center instead of being arranged below the governor's center.

I claim:

1. Variable speed-control device comprising a centrifugal speed governor having outwardly pivotal fly weights opposed by transverse springs, a control member co-axially positioned with respect to said governor and axially movable by the pivoting of said fly weights, a regulating lever shaft mounted for at least limited rotation extending in substantially right angles to the axis of rotation of said governor, a lever connecting said shaft to said control member for limited rotation of said shaft upon axial movement of said control member, a manually operative speed-control lever mounted for limited rotation co-axially with and in spaced relationship to said shaft, a torsion bar connecting said regulating lever shaft to said speed-control lever, and torsion spring means surrounding said torsion bar and connecting said shaft to said speed-control lever, one of said torsion bar and torsion spring means being connected to said speed-control lever for rotation therewith over a smaller arc than the rotational arc of said speed-control lever, said torsion spring means surrounding said torsion bar being connected at one end to a spring bushing on said shaft and at the other end to a spring bushing on said speed control lever.

2. Device according to claim 1, including means for rotatably varying the position of connection for rotation together between said torsion bar and said speed-control lever, and in which said torsion spring means is a cylindrical, helical, torsion spring surrounding said torsion bar and connected at one end to a spring bushing on said shaft and at the other end to a spring bushing on said speed-control lever.

3. Device according to claim 2, including a tube positioned within said helical spring surrounding said torsion bar connected at one end to said shaft and at the other end to said speed control lever for limited rotation with respect thereto over a smaller arc than the arc of rotation of said speed-control lever.

4. Device according to claim 1, in which said torsion spring means comprises a cylindrical, helical, torsion spring surrounding said torsion bar connected at one end to said shaft and at the other end to a spring bushing rotatably mounted co-axially with said speed-control lever, and pin means connecting said bushing and speed-control lever for rotation together over a portion of the rotational arc of said speed-control lever.

5. Device according to claim 1, in which said torsion spring means comprises a multiple number of plate springs surrounding said torsion bar, and including means rotatably varying the position of connection for rotation together between said torsion bar and said speed control lever.

6. Variable speed-control device comprising a centrifugal governor having outwardly pivotal fly weights opposed by transverse springs and a control member axially positioned with respect to said governor and axially movable by the pivoting of said fly weights, a regulating lever connected to said control member, a shaft mounted for at least limited rotation at substantially right angles to the axis of rotation of said governor, means for moving said regulating lever upon rotation of said shaft, a manually operative speed-control lever co-axially positioned with respect to said shaft, torsion bar means connecting said shaft and said speed-control lever for rotation together in one direction, a lever arm freely rotatably surrounding said shaft and positioned for actuation of said control member, and torsion spring means co-axially positioned with respect to said shaft connecting said speed control lever and said lever arm, said torsion spring means surrounding said torsion bar being connected at one end to a spring bushing on said shaft and at the other end to a spring bushing on said speed control lever.

7. Device according to claim 6, which said torsion spring means comprising a first cylindrical, helical, torsion spring surrounding said shaft connected at one end of said spring bushing on said speed-control lever and at the other end to a spring bushing surrounding said shaft and rotatable with respect thereto, and a second substantially cylindrical, helical, torsion spring co-axially positioned with respect to said first spring surrounding said shaft, and connected at one end to said spring bushing and at the other end to a second spring bushing, and including means for rotatably varying the position of connection between said first spring and said second spring, means connecting said second bushing and said speed-control lever for rotation together over a portion of the rotational arc of said speed-control lever, and means connected to said first spring bushing for rotating said lever arm upon rotation thereof, thereby connecting said speed-control lever and said lever arm.

8. Device according to claim 7, in which said regulating lever is pivotably mounted on a movable pivot, and in which said means of moving said regulating lever upon rotation of said shaft includes a bell crank lever positioned for moving said pivot.

9. Variable speed control device comprising a centrifugal governor having outwardly pivotal fly weights opposed by transverse springs, a control member co-axially positioned with respect to said governor and axially movable by the pivoting of said fly weights, a regulating lever pivotally mounted on a slidable pivot and connected at one end to said control member, a shaft mounted for at least limited rotation at substantially right angles to the axis of rotation of said governor, a pivotal lever connected at one end to said shaft for pivoting upon rotation of said shaft and positioned for sliding said pivot of said regulating lever upon pivoting, spring means urging said slidable pivot of said regulating lever in contact with said pivotal lever, a manually operative speed-control lever co-axially positioned with respect to said shaft, means connecting said shaft to said control lever for rotation together in a direction opposing said spring means, a lever arm mounted on said shaft for rotation with respect thereto and positioned for actuation contact with said control member, a first spring bushing rotatably mounted on said shaft, means connecting said first spring bushing and said lever arm for rotation together in at least the direction for contact of said lever arm with said control member, a first cylindrical, helical, torsion spring co-axially positioned with respect to said shaft connected at one end to said first spring bushing and at the other end to said speed-control lever, a second cylindrical, helical, torsion spring surrounding said shaft connected at one end to said first spring bushing and at the other end to a second spring bushing, means connecting said second spring bushing for rotation with said speed-control lever over a portion of the rotational arc of said speed-control lever, and means for rotatably varying the position of the first spring bushing connection between said second spring and said first spring.

10. Device according to claim 9, in which said means connecting said first spring bushing and said lever arm for rotation together includes a projecting member connected to said lever arm and a radially extending pin connected to said first spring bushing positioned for contact with said projecting member, and including spring means biasing said lever arm in a direction for contact between said projecting member and pin.

11. Device according to claim 10, including an end cap and a disc connected for rotation with said speed-control lever, means for varying the rotational position of said end cap and disc with respect to each other and said speed-control lever, a pin radially extending from said shaft, a second pin connected to said end cover for contact with said radially projecting pin, an arched slot defined in said disc, and a pin positioned in said second spring bushing extending in said arch slot.

12. Device according to claim 11, including stop means limiting the arc of pivot of said pivotal lever.

13. Variable speed control device comprising a centrifugal speed governor, a control member actuated by said governor, a regulating lever connected to said control member, a shaft mounted for at least limited rotation, means for moving said regulating lever upon rotation of said shaft, a manually operative speed control lever co-axially positioned with respect to said shaft, means connecting said shaft and control lever for rotation together in at least one direction, a lever arm freely rotatably surrounding said shaft and positioned for actuation of said control member, and torsion means co-axially positioned with respect to said shaft connecting said speed control lever and said lever arm, said torsion means being connected at one end to a spring bushing on said shaft and at the other end to a spring bushing on said speed-control lever.

14. Variable speed-control device comprising a centrifugal speed governor, having outwardly pivotal fly weights acting against transverse springs, a control member actuated by said governor, a shaft connected to said control member for limited rotation upon actuation thereof, a manually operative speed-control lever mounted for limited rotation co-axially with and in spaced relationship to said shaft, a first torsion member extending substantially co-axially with and connecting said shaft to said speed-control lever, and a second torsion member extending substantially co-axially with and conneceted at one end to said shaft and at the other end for rotation with said speed-control lever over a smaller arc than the arc of rotation of said speed-control lever, said torsion members being connected at one end to a spring bushing on said shaft and at the other end to a spring bushing on said speed-control lever, one of said torsion members comprising a torsion bar, and including means for rotatably varying the point of connection for rotation together of said speed-control lever and said second torsion member.

References Cited in the file of this patent

UNITED STATES PATENTS

| | | |
|---|---|---|
| 1,098,956 | Miller | June 2, 1914 |
| 1,442,885 | Hinkley | Jan. 23, 1923 |
| 2,025,347 | Heinzmann | Dec. 24, 1935 |
| 2,117,248 | Hurst et al. | May 10, 1938 |
| 2,358,894 | Volet | Sept. 26, 1944 |
| 2,503,946 | Hallett | Apr. 11, 1950 |
| 2,514,394 | Irving | July 11, 1950 |
| 2,641,464 | Linn | June 9, 1953 |

FOREIGN PATENTS

| | | |
|---|---|---|
| 772,052 | France | Aug. 6, 1934 |
| 881,390 | France | Jan. 22, 1943 |
| 896,594 | France | May 2, 1944 |

UNITED STATES PATENT OFFICE
CERTIFICATE OF CORRECTION

Patent No. 2,995,936                                   August 15, 1961

Fritz Heinzmann

It is hereby certified that error appears in the above numbered patent requiring correction and that the said Letters Patent should read as corrected below.

Column 3, line 56, for "with" read -- this --; line 63, strike out -- is --; column 4, line 5, after "3" insert a period; column 6, line 16, for "directions" read -- direction --; column 7, line 68, before "rotatably" insert -- for --; column 8, line 17, for "comprising" read -- comprises --; line 18, for "of" read -- to --; line 35, for "pivotably" read -- pivotally --.

Signed and sealed this 23rd day of January 1962.

(SEAL)
Attest:

ERNEST W. SWIDER
Attesting Officer

DAVID L. LADD
Commissioner of Patents